Patented Apr. 21, 1936

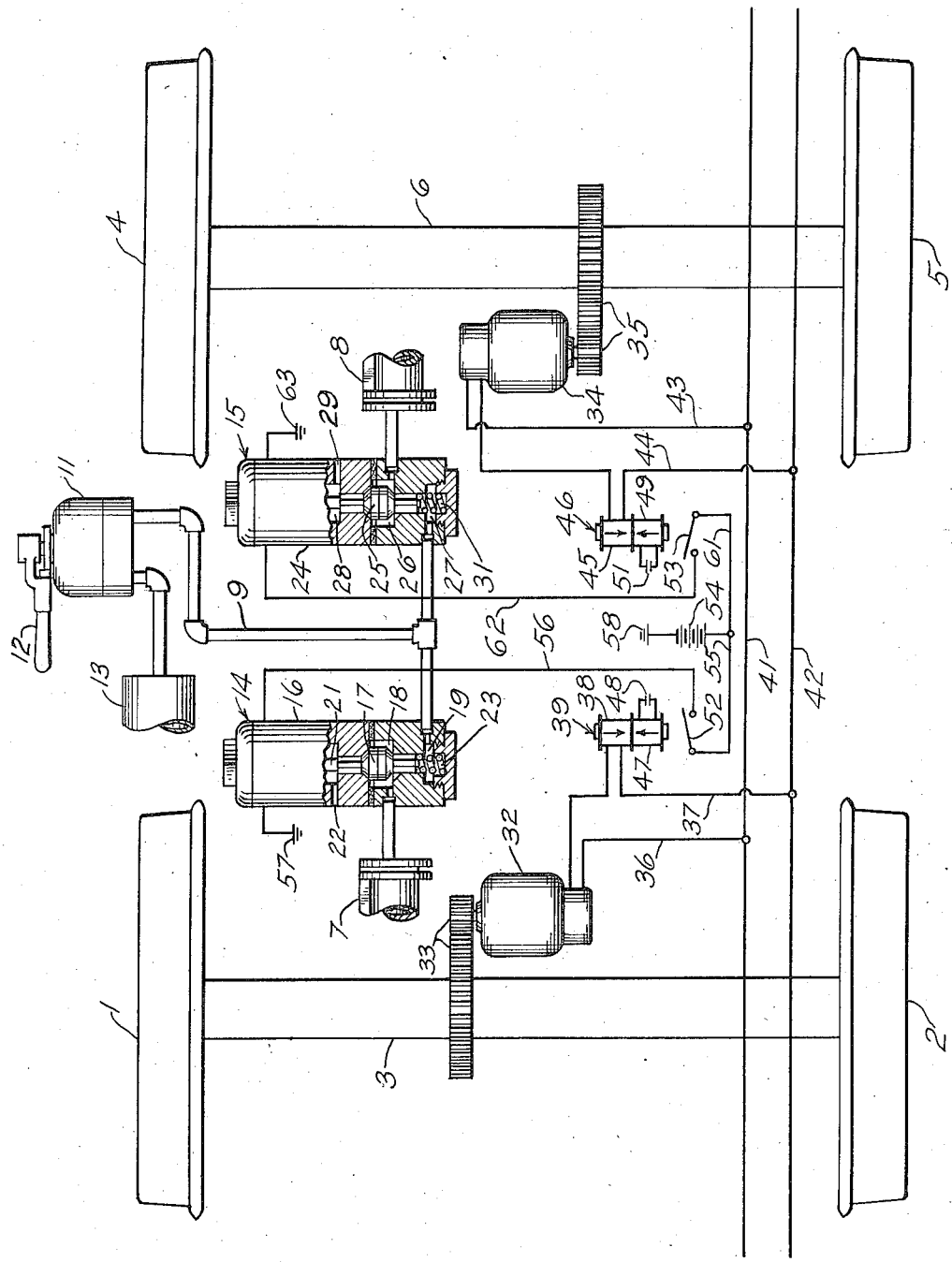

2,038,144

UNITED STATES PATENT OFFICE 2,038,144

APPARATUS FOR PREVENTING WHEEL SLIDING

Frank B. Thomas, Irwin, Pa., assignor to The Westinghouse Air Brake Company, Wilmerding, Pa., a corporation of Pennsylvania Application July 12, 1934, Serial No. 734,757

6 Claims. (Cl. 303—21)

My invention relates to brake equipment for vehicles and more particularly to means for reducing the degree of application of the brakes should the wheels slide on the rails.

It is well known that for a given braking pressure friction type brakes are less effective in retarding the motion of a vehicle at high speeds than at low speeds because the coefficient of friction between the rubbing parts is lower at high speeds than at low speeds. In order to bring a vehicle to a stop quickly it has been the usual practice for an operator to apply the brakes with a high degree of braking pressure at high vehicle speeds, and, as the speed of the vehicle decreases, to so operate the brakes as to cause the braking pressure to decrease in such manner that the vehicle is brought to a stop quickly and smoothly, without dangerous shock or skidding of the wheels.

When railway trains and traction vehicles are operated at very high speeds correspondingly high braking forces must be employed to bring the train or vehicle to a stop in a reasonable length of time. When such braking forces are applied at very high vehicle speeds the problem of properly reducing the braking forces as the vehicle slows down by manual operation of the brake controlling lever becomes a difficult one and there is considerable danger of the wheels sliding on the rails. It is therefore desirable to provide, as a part of the braking equipment on high speed trains and vehicles, some means for detecting and relieving wheel sliding when it occurs.

It is a principal object of my invention to provide means for automatically decreasing the braking force applied to the wheels of a vehicle upon the sliding of the wheels on the rails.

It is another object of my invention to provide means to prevent or reduce the sliding of the wheels on the rails, regardless of whether the train is moving in a forward or in a reverse direction.

It is a more specific object of my invention to provide interconnected electroresponsive means, associated with the several wheel axles of the vehicle or train, that are responsive to the sliding of any of the wheels for reducing the braking force of the brakes associated with a sliding wheel.

Other advantages and objects of my invention will appear from the following description of a specific embodiment thereof when taken in connection with the accompanying drawing in which the single figure illustrates one preferred embodiment of my invention.

Referring to the drawing, car wheels 1 and 2 are provided connected by an axle 3, and car wheels 4 and 5 are provided connected by an axle 6, representing the two pairs of car wheels shown being illustrative of the several pairs of car wheels associated with a railway car or train. Braking means for the wheels 1 and 2 is provided, illustrated by the brake cylinder 7, and braking means for the car wheels 4 and 5 is provided, illustrated by the brake cylinder 8. Means are provided for supplying fluid under pressure to the brake cylinders 7 and 8 and for releasing fluid under pressure from the brake cylinders 7 and 8, comprising brake cylinder pipe 9, a brake valve device 11, actuated by an operating handle 12, and a source of fluid under pressure such as the reservoir 13. The brake valve handle 12 may be operated in a well known manner to effect communication between the reservoir 13 and the brake cylinder pipe 9 to apply the brakes, and to effect communication between the brake cylinder pipe 9 and the atmosphere to effect a release of the brakes.

Magnet valve devices 14 and 15 are provided for controlling the flow of fluid under pressure from the brake cylinder pipe 9 to the brake cylinders 7 and 8, respectively, and for controlling the flow of fluid under pressure from the brake cylinders to the atmosphere when the handle 12 of the brake valve device 11 is in brake application position. The magnet valve device 14 comprises a magnet 16 for operating a double beat valve 17, contained within the valve chamber 18, for controlling communication between the valve chamber 18 and an inlet chamber 19, and between the valve chamber 18 and an outlet chamber 21 that is in communication with the atmosphere through an exhaust port 22. A spring 23 is provided within the inlet chamber 19 for urging the valve 17 upwardly to its illustrated position. The magnet valve device 15 is similar in construction and operation to the magnet valve device 14, and comprises a magnet 24 operatively connected to a double beat valve 25, contained within the valve chamber 26, for controlling communication between the valve chamber 26 and an inlet chamber 27, and between the valve chamber 26 and an outlet chamber 28 that is in communication with the atmosphere through an exhaust port 29. A spring 31 is provided within the inlet chamber 27 for urging the valve 25 upwardly to its illustrated position.

Electric generators, having similar speed voltage characteristics, are provided, operatively connected to the several car wheel axles of the train or vehicle, the generators 32 being illustrated as connected to the axle 3 through gear wheels 33, and generator 34 being illustrated as connected to the axle 6 through gear wheels 35. The terminals of the generator 32 are connected by conductors 36 and 37, through an upper winding 38 of a reverse current relay 39, to conductors 41 and 42 that extend throughout the length of the train and to which all of the several car wheel driven generators are similarly connected. The generator 34 is connected to conductors 41 and 42 by conductors 43 and 44 through the upper winding 45 of a reverse current relay 46. The reverse current relay 39 is provided with a lower winding 47, that is differentially related to the winding 38 and is constantly energized from a suitable source of direct current electrical energy such as the battery 48. The reverse current relay 46 is provided with a second winding 49, that is differentially related to the winding 45, and is constantly energized from a suitable source of direct current energy such as the battery 51.

While the train is at rest, or the several wheel axles of the train are rotating at the same speed, the energization of the windings 47 and 49, respectively, of the reverse current relays 39 and 46, maintain the contact members 52 and 53 in their upper or circuit interrupting positions. Since the generators 32 and 34 are designed to have similar speed voltage characteristics and are connected in like polarity to the circuit conductors 41 and 42, the voltages of the several generators will at all times be alike and no current will flow through the windings 38 and 45 of the reverse current relays 39 and 46, respectively, so long as the wheel axles 3 and 6 revolve at the same rate of speed.

Should the operator move the handle 12 to supply fluid under pressure to the brake cylinders 7 and 8 to apply the brakes, and should the degree of application of the brakes to one pair of wheels, say to the wheels 1 and 2, become sufficient to cause the wheels to slide on the rails, the electromotive force developed by the generator 32 will be less than the electromotive force between the conductors 41 and 42, so that current will flow from the conductors 41 and 42 to the generator through the winding 38 of the reverse current relay 39. The magnetic flux produced by the flow of current from the conductors 41 and 42 through the winding 38 to the generator 32 will be in a direction to oppose the magnetic flux developed by the winding 47, thus deenergizing the relay 39 and permitting the contact member 52 thereof to drop to its circuit closing position and complete a circuit from a source of electrical energy 54 through conductor 55, contact member 52 of the relay 39, conductor 56, the winding of the magnet 16, to ground at 57, and to the grounded terminal 58 of the battery 54. The closing of this circuit energizes the winding of the magnet valve device 14 causing it to move the valve 17 downwardly to cut off communication between the brake cylinder pipe 9 and the brake cylinder 7, and to effect communication from the brake cylinder 7, through the outlet chamber 21 and exhaust port 22, to the atmosphere to release fluid under pressure from the brake cylinder. Upon a sufficient release of fluid under pressure from the brake cylinder 7 to reduce the braking force on the wheels 1 and 2 an amount sufficient to permit the wheels to again roll on the rails, the electromotive force developed by the generator 32 will again correspond to that developed by the other generators connected to the conductors 41 and 42, and will oppose the flow of current through the winding 38 of the reverse current relay 39, thus permitting the winding 47 to again energize the core of the relay and actuate the contact member 52 upwardly to its current interrupting position to effect deenergization of the winding of the magnet 16. The valve 17, that is influenced by the pressure of the spring 23, is moved upwardly to its illustrated position to prevent a further release of fluid under pressure from the brake cylinder 7, and to effect communication between the brake cylinder 7 and the brake cylinder pipe 9.

It will be appreciated that, upon a decrease in the speed of any of the generators associated with the car wheels sufficiently that its electromotive force drops below the voltage between the conductors 41 and 42, the current supplied from the conductors to the generators, through the upper winding of the reverse current relay, is supplied from the other generator connected to the conductors 41 and 42. However since this current is supplied from the generators to the conductors 41 and 42, instead of in the reverse direction, it will not cause the deenergization of the reverse current relays associated with those generators supplying it. For example, in the illustrated embodiment of the invention in which two car wheel axle generators are illustrated, the current flowing from the conductors 41 and 42 to the generator 32 is supplied from the generator 34 and will flow through the winding 45 of the reverse current relay 46 in a direction to produce a flux that is cumulative with or in the same direction as, the flux produced by the winding 49, thus increasing, instead of decreasing, the energization of the reverse current relay 46 while this same current flowing to the generator 32, through the winding 38, will be in a direction to cause the deenergization of the reverse current relay 39.

In a similar manner, should the car wheels 4 and 5 revolve at a speed less than that of the car wheels 1 and 2, the generator 34 will revolve at a speed less than that of the generator 32, and the electromotive force developed by the generator 34 will be less than the voltage between the conductors 41 and 42, thus causing current to flow from the conductors 41 and 42 to the generator 34 through the winding 45 of the reverse current relay 46. This current will produce a flux in the core of the relay 46 that is in opposition to the flux produced by the winding 49, thus causing the relay to become deenergized and permit the contact member 53 to drop to its lower or circuit closing position. A circuit is now completed from the battery 54 through conductor 61, contact member 53 of the relay 46, conductor 62, the winding of the magnet 24, to ground at 63 and to the grounded terminal 58 of the battery 54, thus energizing the winding of the magnet 24 and causing the valve 25 to be moved downwardly to close communication between the brake cylinder pipe 9 and the brake cylinder 8 and open communication between the brake cylinder 8 and the atmosphere through outlet chamber 28 and exhaust port 29. The release of fluid under pressure from the brake cylinder 8 causes the braking force applied to the wheels 4 and 5 to be reduced, and, upon a sufficient reduction in this braking force to again permit the wheels to roll freely on the rails, the electromotive force generated by the generator 34 will again correspond to the voltage between the conductors 41 and 42 and oppose the flow of current from these conductors through the winding 45 of the reverse current relay 46, thus permitting the winding 49 to again energize the relay and operate the contact member 53 upwardly to its circuit interrupting position. The magnet 24 will then become deenergized and the spring 31 will move the valve 25 to its upper or illustrated position, thus cutting off communication between the brake cylinder 8 and the atmosphere through the chamber 28 and the exhaust port 29, and again effecting communication between the brake cylinder pipe 9 and the brake cylinder 8.

While, in the illustrated embodiment of my invention, two pairs of vehicle wheels are shown together with two brake cylinders and two axle driven generators, it will be obvious that any number of brake cylinders and axle driven generators may be provided as desired.

While I have illustrated and described one preferred embodiment of my invention it will be apparent to those skilled in the art that many changes in the circuits and apparatus described may be made within the spirit of my invention and I do not wish to be limited otherwise than by the scope of the appended claims.

Having now described my invention, what I claim as new and desire to secure by Letters Patent, is:

1. In a brake equipment for vehicles, in combination, a plurality of pairs of car wheels, braking means associated with each of said several pairs of wheels, electrical means associated with each of said several pairs of car wheels, common means connecting said several electrical means, and means responsive to the flow of current to one of said electrical means for effecting a decrease in the braking force of its associated braking means.

2. In a brake equipment for vehicles, in combination, a plurality of pairs of car wheels, braking means associated with each of said several pairs of car wheels, electrical means associated with each of said several pairs of car wheels for delivering an output voltage that is a measure of the speed of the associated wheels, common circuit means connected to said several electrical means, and means responsive to a drop in the output voltage from any of said electrical means below the voltage of said connecting circuit means for effecting a decrease in the braking force of its associated braking means.

3. In a brake equipment for vehicles, in combination, a plurality of groups of vehicle wheels, a brake cylinder associated with each wheel group, an electrical means associated with each wheel group for delivering an output voltage that is responsive to the speed thereof, a common circuit connecting said several electrical means, and means responsive to the flow of current between said several electrical means for effecting the release of fluid under pressure from a brake cylinder associated with an electrical means that delivers an output voltage less than the voltage of the connecting circuit.

4. In a brake equipment for vehicles, in combination, a plurality of groups of vehicle wheels, a brake cylinder associated with each wheel group, an electrical generator associated with each wheel group and responsive to the speed thereof, reverse current relay means responsive to a reduction in the speed of the wheels of one group with respect to the wheels of other wheel groups and controlled by said electrical means for effecting the release of fluid under pressure from the brake cylinder associated with said first named wheel group.

5. In a brake equipment for vehicles, in combination, a plurality of groups of vehicle wheels, a brake cylinder associated with each wheel group, means for effecting the release of fluid under pressure from the brake cylinder associated with each of said wheel groups comprising an electrical generator associated with each wheel group and responsive to the speed thereof, and a relay associated with each generator and having a winding energized upon a reduction in the speed of the wheels of the associated group with respect to the wheels of the other wheel groups and controlled by said electrical generator.

6. In a brake equipment for vehicles, in combination, a plurality of groups of vehicle wheels, a brake cylinder associated with each wheel group, an electric generator associated with each wheel group connected to a common circuit and adapted to produce an output voltage corresponding to the speed thereof, means associated with each wheel group for effecting the release of fluid under pressure from the brake cylinder associated with that group, a relay for controlling said means provided with two windings, one of said windings being constantly energized and the other being between the associated generator and said common circuit to be energized from said generator to produce a flux in opposition to the first named winding upon a reduction in the speed of the associated wheel group with respect to the wheels of the other wheel groups.

FRANK B. THOMAS.